United States Patent Office 3,390,186
Patented June 25, 1968

3,390,186
PREPARATION OF ALDEHYDES
AND KETONES
Henri Normant, Paris, France, assignor to Rhone-
Poulenc S.A., Paris, France
No Drawing. Filed July 14, 1965, Ser. No. 472,029
Claims priority, application France, July 17, 1964,
982,102
5 Claims. (Cl. 260—590)

ABSTRACT OF THE DISCLOSURE

α-Ethylenic aldehydes and ketones of the formula:

R—CH=CH—CO—R₁ where R is alkyl or phenyl and R₁ is hydrogen, alkyl or phenyl are made by contacting a compound of formula:

R—C≡C—CH(A)—R₁ where A is alkoxy, phenoxy, alkylthio, phenylthio, dialkylamino, diphenylamino, or N-alkyl-N-phenylamino, with potassium t-butoxide in dimethylsulphoxide, and hydrolysing the allene produced with a strong aqueous non-oxidizing mineral acid.

---

This invention relates to the preparation of α-ethylenic aldehydes and ketones.

Various processes for the preparation of such aldehydes and ketones are known. More particularly, a process for the preparation of these compounds from vinyl organomagnesium derivatives is described in French Patent No. 1,187,103.

The present invention provides a process for the preparation of α-ethylenic aldehydes and ketones from α-acetylenic ethers, thioethers, or amines. The possibility of isomerising propargyl thioethers and 1-ethylthio-1-alkynes into allenic thioethers has already been observed. The isomerisation of propargyl ethers into allenic ethers, or of 1-carboxy-2-alkynes into 1-carboxyallene derivatives, is also known.

According to the present invention, an α-ethylenic aldehyde or ketone of the formula:

R—CH=CH—CO—R₁ in which R represents alkyl, e.g. of 1 to 10 carbon atoms or phenyl and R₁ represents hydrogen, alkyl of 1 to 5 carbon atoms, or phenyl, is prepared by contacting a compound of the formula:

R—C≡C—CH(A)—R₁ in which R and R₁ are as hereinbefore defined and A is alkoxy, phenoxy, alkylthio, phenylthio, dialkylamino, diphenylamino or N-alkyl-N-phenylamino with potassium t-butoxide in dimethylsulphoxide, and thereafter hydrolysing the allenic compound of the formula:

R—CH=C=C(A)—R₁ produced, with an aqueous solution of a strong non-oxidizing mineral acid.

The initial isomerisation may be effected by simply mixing the reactants at ambient temperature, i.e. at about 20° C. However, it is to be understood that slightly lower or slightly higher temperatures may be preferable, and that the optimum temperature suitable for each specific case is readily ascertainable by simple test.

The subsequent hydrolysis generally takes place quite simply at ambient temperature (20° C.), but here again slightly different temperatures from 10 to 40° C. may be preferable. The acid employed is generally hydrochloric acid or sulphuric acid.

It has been found that this new method is particularly useful in the preparation of compounds in which at least one of the substituents R and R₁ is phenyl.

In operating the process, it is unnecessary to isolate the allene intermediate compound, and the hydrolysis can be carried out directly on the reaction product from the first reaction.

The acetylenic starting materials may be prepared by application of known methods, for example those diagrammatically represented as follows:

(a) For acetylenic ethers:

R—C≡C—MgHal+ClCH(R₁)OB

→R—C≡C—CH(R₁)OB+MgCl.Hal where B represents an alkyl or phenyl radical.

(b) For acetylenic thioethers:

R—C≡C—CH(R₁)Br+NaSB

→R—C≡C—CH(R₁)SB+NaBr where B is as hereinbefore defined.

(c) For acetylenic amines:

R—C≡C—MgHal+alkyl-O—CH(R₁)—N<

→R—C≡C—CH(R₁)—N<+Mg(O-alkyl)Hal

The new process has the advantage of providing a new means for obtaining α-ethylenic ketones or aldehydes, e.g. cinnamic aldehyde, which is an important industrial compound. The new process is interesting because the acetylenic starting materials can be produced in very good yields, and their conversion into α-ethylenic aldehydes and ketones in accordance with this invention also takes place in good yield.

The following examples illustrate the invention.

EXAMPLES

Into a three-necked round-bottomed 250 cc. flask, provided with a mechanical stirrer, a dropping funnel and a thermometer, is introduced from 0.1 to 0.25 mol. of the acetylenic starting material. 20 cc. of dimethylsulphoxide in which 0.5 g. of powdered potassium t-butoxide have been dissolved are introduced into the dropping funnel. The temperature in the flask is 20° C. The potassium t-butoxide solution is introduced drop-by-drop, and the contents of the flask blacken, while the temperature rises to 30° C. Stirring is continued until the temperature begins to fall. All the reaction mixture is then run into a beaker, and 20 cc. of 30% dilute hydrochloric acid are added, and the mixture is allowed to stand for 15 minutes. The whole is then taken up in 2 x 50 cc. of diethyl ether, and the ethereal solution is separated and dried over anhydrous sodium sulphate. The solvents are driven off and the residue is then fractionated in vacuo. The α-ethylenic ketone or aldehyde is collected. Since the isomerisation of the acetylenic starting material is generally not complete, a proportion of the latter is collected during the fractionation, and can be reused in another operation.

The following table lists a number of α-ethylenic ketones and aldehydes obtained by this procedure from acetylenic ethers.

TABLE I

| No. | Acetylenic starting material | Aldehyde or Ketone obtained | Boiling point and corresponding pressure | Yield, percent | Characteristic derivative of Aldehyde or Ketone |
|---|---|---|---|---|---|
| 1 | $C_6H_5-C\equiv C-CH_2-O-C_2H_5$ | $C_6H_5-CH=CH-C(H)=O$ | 78°/0.5 mm | 50 | DNPH: M.P. 257°; acid M.P. 133°. |
| 2 | $C_6H_5-C\equiv C-CH(CH_3)-O-C_2H_5$ | $C_6H_5-CH=CH-C(CH_3)=O$ | 76°/0.15 mm. (M.P.=40°) | 67 | DNPH: M.P. 225°; semicarbazone 188°. |
| 3 | $C_6H_5-C\equiv C-CH(C_2H_5)-O-C_2H_5$ | $C_6H_5-CH=CH-C(C_2H_5)=O$ | 90°/0.15 mm. (M.P.=38°) | 50 | DNPH: M.P. 215°. |
| 4 | $C_6H_5-C\equiv C-CH(nC_3H_7)-O-C_2H_5$ | $C_6H_5-CH=CH-C(nC_3H_7)=O$ | 88°/0.08 mm | 55 | DNPH: M.P. 187°; semicarbazone M.P. 154°. |
| 5 | $C_6H_5-C\equiv C-CH(nC_5H_{11})-O-C_2H_5$ | $C_6H_5-CH=CH-C(nC_5H_{11})=O$ | | 44 | DNPH: M.P.=148-150°. |
| 6 | $C_6H_5-C\equiv C-CH(C_6H_5)-O-C_2H_5$ | $C_6H_5-CH=CH-C(C_6H_5)=O$ | M.P.=57-58° | 20 | DNPH: M.P.=249°. |
| 7 | $nC_4H_9-C\equiv C-CH(C_6H_5)-O-C_2H_5$ | $nC_4H_9-CH=CH-C(C_6H_5)=O$ | 107°/0.1 mm | 66 | DNPH: M.P. 131°. |

Likewise, the following results were obtained when starting with thioethers and aminoacetylenic compounds.

TABLE II

| No. | Acetylenic starting material | Aldehyde or Ketone obtained | Boiling point and corresponding pressure | Characteristic derivative of Aldehyde or Ketone |
|---|---|---|---|---|
| 8 | $C_6H_5-C\equiv C-CH(CH_3)-S-C_2H_5$ | $C_6H_5-CH=CH-C(CH_3)=O$ | | DNPH: M.P. 227°. |
| 9 | $C_6H_5-C\equiv C-CH(C_2H_5)-S-C_2H_5$ | $C_6H_5-CH=CH-C(C_2H_5)=O$ | | DNPH: M.P. 215°. |
| 10 | $C_6H_5-C\equiv C-CH(nC_5H_{11})-S-C_2H_5$ | $C_6H_5-CH=CH-C(nC_5H_{11})=O$ | | DNPH: M.P. 148°. |
| 11 | $C_6H_5-C\equiv C-CH_2N(C_2H_5)_2$ | $C_6H_5-CH=CH-C(H)=O$ | | DNPH: M.P. 257°. |
| 12 | $C_6H_5-C\equiv C-CH(C_6H_5)-N(CH_3)_2$ | $C_6H_5-CH=CH-C(C_6H_5)=O$ | | DNPH: M.P. 253°. |
| 13 | $C_6H_5-C\equiv C-CH_2N(C_2H_5)(C_6H_5)$ | $C_6H_5-CH=CH-C(H)=O$ | | DNPH: M.P. 257°. |

In the foregoing tables: the boiling points are in degrees centigrade at the pressure given in millimetres of mercury; DNPH stands for the 2,4-dinitrophenyl-hydrazone of the aldehyde or ketone; and melting points are given in degree centigrade.

I claim:

1. Process for the preparation of an α-ethylenic aldehyde or ketone of the formula:

$$R-CH=CH-CO-R_1$$

in which R represents alkyl of 1 to 10 carbon atoms or phenyl, and $R_1$ represents hydrogen, alkyl of 1 to 5 carbon atoms, or phenyl, which comprises contacting a compound of the formula:

$$R-C\equiv C-CH(A)-R_1$$

in which R and $R_1$ are as hereinbefore defined and A is alkoxy, phenoxy, alkylthio, phenylthio, dialkylamino, diphenylamino or N-alkyl-N-phenylamino, with potassium t-butoxide in dimethylsulphoxide, and thereafter hydrolysing the allenic compound of the formula:

$$R-CH=C=C(A)-R_1$$

produced, with an aqueous solution of a strong non-oxidising mineral acid.

2. Process according to claim 1, in which the reactants are mixed at ambient temperature with no external application of heat.

3. Process according to claim 1, in which the intermediate allenic compound is not isolated before the hydrolysis.

4. Process according to claim 1, in which the mineral acid is hydrochloric acid or sulphuric acid.

5. Process for the preparation of an α-ethylenic aldehyde or ketone of the formula:

$$R-CH=CH-CO-R_1$$

in which R represents alkyl of 1 to 10 carbon atoms or phenyl, and $R_1$ represents hydrogen, alkyl of 1 to 5 carbon atoms, or phenyl, which comprises contacting a compound of the formula:

$$R-C\equiv C-CH(A)-R_1$$

in which R and $R_1$ are as hereinbefore defined and A is alkoxy, phenoxy, alkylthio, phenylthio, dialkylamino, diphenylamino or N-alkyl-N-phenylamino, at ambient temperature with no external application of heat, with potassium t-butoxide in dimethylsulphoxide, and thereafter hydrolysing the allenic compound of the formula:

$$R-CH=C=C(A)-R_1$$

produced without isolating it, with an aqueous solution of a strong non-oxidising mineral acid.

References Cited

UNITED STATES PATENTS 2,853,520  9/1958  Newman _____ 260—590

DANIEL D. HORWITZ, *Primary Examiner.*